United States Patent
Caldwell

(10) Patent No.: US 7,087,706 B2
(45) Date of Patent: Aug. 8, 2006

(54) POLYESTER WITH HIGH CARBOXYL END GROUPS AND METHODS FOR MAKING

(75) Inventor: Sarah Elizabeth Caldwell, Spartanburg, SC (US)

(73) Assignee: Invista North America, S.a.r.l, Charlotte, NC (US)

( * ) Notice: Subject to any disclaimer, the term of this patent is extended or adjusted under 35 U.S.C. 154(b) by 68 days.

(21) Appl. No.: 10/773,492

(22) Filed: Feb. 6, 2004

(65) Prior Publication Data

US 2005/0176920 A1  Aug. 11, 2005

(51) Int. Cl.
*C08G 63/00* (2006.01)

(52) U.S. Cl. .................. 528/272; 264/176.1; 264/219; 428/34.1; 428/35.7; 528/271

(58) Field of Classification Search ............. 264/176.1, 264/219; 428/34.1, 35.7; 528/271, 272
See application file for complete search history.

(56) References Cited

U.S. PATENT DOCUMENTS

| | | | |
|---|---|---|---|
| 3,542,737 A | 11/1970 | Keck | |
| 4,124,571 A | 11/1978 | Georgoudis | |
| 4,698,411 A | 10/1987 | Hill | |
| 4,753,975 A | 6/1988 | Vanderkooi | |
| 5,244,917 A | 9/1993 | Petraitis et al. | |
| 5,344,937 A | 9/1994 | Barnett et al. | |
| 5,552,475 A | 9/1996 | Sundararaman et al. | |
| 6,342,578 B1 * | 1/2002 | Huang | 528/271 |

* cited by examiner

*Primary Examiner*—Terressa Boykin
(74) *Attorney, Agent, or Firm*—Gregory N. Clements

(57) ABSTRACT

The present invention relates to a polyester or copolyester composition containing a substituted cyclic anhydride, having a carboxyl end group of greater or equal to 25 mmol/kg. The present invention also concerns a method of making such a polyester or copolyester by late injection of the substituted cyclic anhydride at the end of polycondensation, or alternatively adding the substituted cyclic anhydride to the preform injection molding machine, prior to stretch blow molding a container.

17 Claims, No Drawings

POLYESTER WITH HIGH CARBOXYL END GROUPS AND METHODS FOR MAKING

BACKGROUND OF THE INVENTION

1) Field of the Invention

The present invention concerns a polyester resin having a high number of carboxyl end groups (CEG) and a method of making such a resin. Specifically, the polyester is polyethylene terephthalate (PET) or a copolyester of PET, along with a substituted cyclic anhydride resulting in a high CEG content resin. The polyester is employed as a packaging resin useful in soft drink beverage bottles, for example, with significantly improved stress cracking resistance. More particularly, the present invention also concerns methods of producing the polyester by introducing at the end of polycondensation, or at injection molding, one or more substituted cyclic anhydrides.

2) Prior Art

Polyester bottle resin is well known in the art. Typical polyester bottle resins employ a copolyester of terephthalic acid and a second dicarboxylic acid such as isophthalic acid. The second dicarboxylic acid adjusts the rate of crystallization of PET by decreasing it, in order to obtain clear bottle/jar preforms, which are stretch-blow molded into bottles. If a crystallization retarding agent is not employed, crystallization of the preform occurs resulting in a hazy preform and a hazy bottle/jar. However, if too much of the second dicarboxylic acid is used, the physical properties of copolyester resin are significantly weaker than a polyester resin of terephthalic acid and ethylene glycol (polyethylene terephthalate, PET). Alternatively other diols such as diethylene glycol and 1,4-cyclohexanedimethanol can be used as comonomers with ethylene glycol to retard crystallization.

Later, it was observed that an increase in isophthalic acid improved barrier properties of the bottle/jar of the copolyester resin. A balance in the amount of dicarboxylic acid employed was necessary to adjust the rates of crystallization to avoid haze and improve the barrier properties, but avoid significantly weakening the copolyester (compared to PET resin).

It was then realized that the smaller (e.g. 20 ounce) soft drink beverage bottles, which have a larger volume/surface area ratio, require a higher barrier property than larger (2 liter) bottles. Thus the resin composition for smaller soft drink bottles contains more isophthalic acid to improve the barrier properties, than larger bottles.

The increase in isophthalic acid in copolyester resins has led to somewhat weaker physical properties especially for the smaller soft drink bottle. This weakening is observed in bottle failure from stress cracking, a problem not known before the significant increase in isophthalic acid. Stress cracking occurs over time, generally in the base of the bottle, causing a bottle under pressure with carbonated liquid to either lose pressure, or in the extreme, burst. Stress cracking can be initiated by the alkaline lubricants used in the bottle filling lines, or by the residues of alkaline cleaning solutions on store shelves.

U.S. Pat. No. 6,342,578 to Huang solved this problem by introducing at the end of polycondensation, one or more of phthalic anhydride, glutaric anhydride, benzoic anhydride, maleic anhydride or succinic anhydride in an amount sufficient to significantly reduce the caustic stress cracking. The anhydrides reacted with the hydroxyl end groups to form carboxyl end groups (CEG). This patent, which is commonly assigned, is hereby incorporated by reference.

The inventors have found that the reactivity of the anhydrides disclosed by Huang require a residence time of several minutes at the end of polymerization to completely react. Unreacted anhydrides can cause problems if they volatilize during extrusion or solid-state polymerization.

U.S. Pat. No. 3,542,737 to Keck discloses copolyesters of polyethylene terephthalate (PET) with 0.5 to 15 mole % substituted succinic acids. This was directed at preparing a copolyester fiber that could be dyed at atmospheric pressure. The substituted succinic anhydride was added to the monomer before polycondensation, thus the polymer would have sufficient reaction time to form copolyester with a normal CEG level. There was no teaching with regard to the use of these substituted succinic acids for improving the stress cracking propensity of PET.

U.S. Pat. No. 4,124,571 to Georgoudis discloses thermoplastic copolyesters for adhesives. These copolyesters contain at least 20 mole % of an aliphatic dicarboxylic acid and designed to give low glass transition temperatures. Substituted succinic anhydrides are disclosed as the aliphatic dicarboxylic acid component.

U.S. Pat. No. 4,698,411 to Hill discloses an unsaturated resin syrup containing styrene monomer in which the styrene volatilization is suppressed by using a substituted succinic anhydride in place of the saturated dicarboxylic acid component of the unsaturated polyester resin.

U.S. Pat. No. 4,753,975 to Vanderkooi discloses a polyester molding resin comprising PET and a nucleation agent consisting of up to 10 weight % of a linear saturated polyester and a compound having at least one functional group selected from the class consisting of anhydrides, epoxides and hydroxyls. One of the preferred anhydride is dodecenyl succinic anhydride.

None of these prior art patents address the problem associated with the late addition of cyclic anhydrides to polyester to increase the CEG level for reducing caustic stress cracking.

It is an object of the present invention to produce copolyester containing a substituted cyclic anhydride, for improved stress cracking resistance in a container, which can be prepared without volatilization of the anhydride. Likewise, it is another object of the present invention to manufacture copolyester containing substituted cyclic anhydride without volatilization, for improved stress cracking resistance in a container.

SUMMARY OF THE INVENTION

The inventors have found that the objects of the present invention can be achieved by using substituted cyclic anhydrides in place of the anhydrides disclosed in U.S. Pat. No. 6,342,578. Moreover, using the higher molecular weight substituted cyclic anhydride solved the problem associated with the slow reactivity of the anhydrides disclosed in U.S. Pat. No. 6,342,578, and in addition the substituted cyclic anhydrides did not have the volatilization problem during extrusion and solid state polymerization.

In the broadest sense, the present invention refers to a polyester or copolyester composition consisting of PET or PET and up to 20 wt % of a dicarboxylic acid such as isophthalic acid or naphthoic acid or up to 10 wt % of a diol such as diethylene glycol or 1,4-cyclohexanedimethanol, and up to 2 weight % of a substituted cyclic anhydride, and has a CEG content greater than 25 millimoles per kilogram (mmole/kg). More preferably, the polyester or copolyester compositions of the present invention have an Intrinsic Viscosity (IV) greater than about 0.70. Most preferably, the polyester or copolyester compositions of the present invention have an IV greater than about 0.75.

The broad scope of the present invention contemplates a CEG value of 25 to about 80 mmole/kg, a preferred range is 30 to about 60 mmol/kg, and a most preferred range is 40 to about 50 mmol/kg.

In the broadest sense, the present invention also comprises a method of manufacturing a resin composition having reduced stress cracking by adding at least one substituted cyclic anhydride as a late addition during the melt polymerization process for producing PET, or a copolymer of PET and dicarboxylic acid such as isophthalic acid or naphthoic acid, or a copolymer of PET and a diol such as diethylene glycol or 1,4-cyclohexanedimethanol.

In the broadest sense, the present invention also comprises a method of manufacturing a resin composition having reduced stress cracking by producing PET or a copolymer of PET and dicarboxylic acid such as isophthalic acid or naphthoic acid, or a copolymer of PET and a diol such as diethylene glycol or 1,4-cyclohexanedimethanol, and adding substituted cyclic anhydride at the injection molding machine used to manufacture the preform for the container.

DETAILED DESCRIPTION OF THE INVENTION

Polyethylene terephthalate (PET) is conventionally made by reacting either dimethyl terephthalate or terephthalic acid with ethylene glycol, for example, via an esterification reaction, followed by a polycondensation reaction. When making PET, either in a batch or continuous process, the reactions can be driven to near completion, yielding PET having up to 3 weight percent of diethylene glycol and other byproducts. PET is meant to include small amounts of byproducts.

Conventional continuous production of PET is well known in the art and comprises reacting terephthalic acid and ethylene glycol at a temperature of approximately 200° to 250° C. forming monomer and water. Because the reaction is reversible, the water is continuously removed, driving the reaction to the production of monomers and some oligomers. Next the monomers and oligomers undergo polycondensation reaction in vacuum conditions at a temperature of approximately 250° to 290° C. to form polyester having an IV of about 0.4 to 0.6. During the esterification reaction, no catalyst is needed. However, in the polycondensation reaction, a catalyst such as an antimony compound or titanium compound is necessary.

PET is also made in batch and continuous processes from the reaction of the ester-dimethyl terephthalate and ethylene glycol, at a reaction temperature of approximately 190° to 230° C. forming alcohol (methanol) and monomer. This esterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional catalyst are employed. Next, the monomer and oligomer undergo a polycondensation reaction at the conditions stated above to form polyester or copolyester having an IV of about 0.4 to 0.6. Making a copolyester of PET and a dicarboxylic acid (to reduce the crystallization rate and improve its barrier properties) merely requires the addition of the acid or its ester equivalent, for example, to also undergo an esterification (or transesterification) reaction. Making a copolyester of PET and a diol merely requires the addition of the diol during esterification (or transesterification). For use as a bottle resin the polyester or copolyester from this melt phase reaction is solid state polymerized by conventional methods to increase the resin molecular weight (IV).

Resins containing up to 20 wt % of the dicarboxylic acid are useful in forming bottles or jar containers as is known in the art. Suitable diacids may be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often preferred to use a functional acid derivative equivalent such as dimethyl, diethyl, or dipropyl ester of the dicarboxylic acid. Bottle resin, including the present invention, typically contains 1.5–20 wt. %, based on the weight of the resin, of isophthalic acid as the crystallization retarder and barrier improvement additive.

Alternatively, polyester resins may optionally be modified by up to 20 wt % of one or more different diols than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

In the making of bottle preforms and plastic bottles from the preforms, it is often desired to produce the cleanest, clearest polymer. Accordingly, the fewer additives employed, the clearer the polymer produced. On the other hand, it is sometimes desirable to make a colored plastic bottle or bottles with other desired characteristics, and thus the use of a variety of conventionally known additives is also within the scope of the present invention. Accordingly, various pigments, dyes, fillers, branching agents, and other typical agents may be added to the polymer generally during or near the end of the polycondensation reaction. The exact desired additives and the place on introduction in the reaction do not form a part of this invention and this technology is well known in the art. Any conventional system may be employed and those skilled in the art can pick and choose among the various systems of introduction of additives to achieve the desired result.

With the present invention, it is preferred that the substituted, high molecular weight cyclic anhydride (substituted cyclic anhydride has a higher molecular weight than unsubstituted cyclic anhydride) is introduced late in the melt polymerization process such as late in the polycondensation process just prior to solid state polymerization. Specifically, the substituted, high molecular weight cyclic anhydride could be added near the end of the polycondensation polymerization process such that it has at least two to four minutes reaction time before the polymer is extruded, cooled and cut into chip.

If a batch process is used, there are two reactor vessels, one for esterification, which is generally at atmospheric pressure and at a temperature of from about 180° to 250° C.

Then the esterified reaction products are transferred to a polycondensation vessel, which is operated at a higher temperature, generally between 250° to 290° C. and at a vacuum. Accordingly, the substituted, high molecular weight cyclic anhydride of the present invention would be added to polyester resin at the end of polycondensation reaction, just after the vacuum is permitted to attain atmospheric pressure, such that it reacts with the polymer for at least two to four minutes before it is extruded, cooled and cut into chip.

If a continuous process is used, substituted cyclic anhydride is added to the transfer pipe between the final polymerizer and the die that forms the strands that are cooled and cut into chips. Substituted cyclic anhydride added at this point has a mixing time of about two to four minutes (the residence time) in the piping as it flows from the high polymerizer vessel to the die where it is extruded, then cooled and cut into chip.

After polycondensation, the polyester is extruded, cooled and cut into chip as conventionally known in the art. The chip is ready for solid state polymerization (SSP), where the chip IV is generally increased from about 0.4–0.6 to 0.65–0.95.

Alternatively the polyester or copolyester resin can be prepared by conventional melt and solid state polymerization methods. The substituted cyclic anhydride is injected into the extruder of the preform injection molding machine. For this process it is preferred that the substituted cyclic anhydride has a melting point near or below ambient temperatures. This simplifies the addition of the anhydride into the extruder, as complicated heating systems are not required.

The amount of substituted cyclic anhydride employed in the composition is from about 0.2 to 2.0 wt. % (weight percent) based on the weight of the polyester/copolyester. This amount should not exceed more than about 100 millimoles per kilogram (mmol/kg) of the polyester/copolyester, and preferably not more than about 50 mmol/kg of the polyester/copolyester.

Suitable cyclic anhydrides are those with a melt point of less than the polyester, preferably less than about 160° C., and more preferably less than about 125° C. Most preferable are cyclic anhydrides with a melt point less than about 100° C. and especially suitable are those that are liquid at room temperature (25° C.).

The substituted and high molecular weight cyclic anhydrides are selected from the following classes:

a) substituted succinic anhydrides

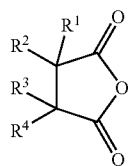

where $R^1$, $R^2$, $R^3$ and $R^4$ can be hydrogen, alkyl, alkenyl or aryl groups, and at least one group is not hydrogen.

Included in this class of substituted succinic anhydrides are cycloalkane and cycloalkene substituents, giving such compounds as hexahydrophthalic anhydride and substituted hexahydrophthalic anhydride:

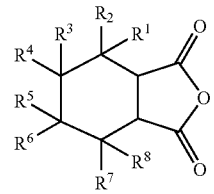

where $R^1$, $R^2$, $R^3$, $R^4$ $R^5$, $R^6$, $R^7$ and $R^8$ can be hydrogen, alkyl, alkenyl or aryl groups.

Also included in this class are itaconic (2-methylene succinic anhydride) and substituted itaconic anhydrides:

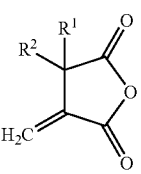

where $R^1$ and $R^2$ can be hydrogen, alkyl, alkenyl or aryl groups.

From this class, the mono-alkenyl substituted succinic anhydrides are preferred. The most preferred are the $C_8$ to $C_{20}$ alkenyl groups.

b) substituted maleic anhydride

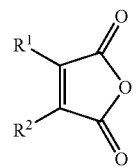

where $R^1$ and $R^2$ can be hydrogen, alkyl, alkenyl or aryl groups, and at least one group is not hydrogen.

Also included in this class are cycloalkane and cycloalkene substituents, giving such compounds as 3,4,5,6-tetrahydrophthalic anhydride and substituted tetrahydrophthalic anhydride groups:

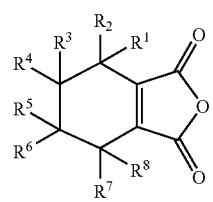

where $R^1$, $R^2$, $R^3$, $R^4$, $R^5$, $R^6$, $R^7$ and $R^8$ can be hydrogen, alkyl, alkenyl or aryl groups. and substituted 1-cyclopentene-1,2-dicarboxylic anhydride:

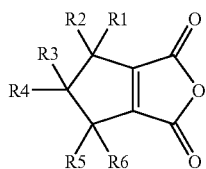

where $R^1$, $R^2$, $R^3$, $R^4$, $R^5$ and $R^6$ can be hydrogen, alkyl, alkenyl or aryl groups.

From this class, 2-methyl maleic anhydride (citraconic anhydride) and diphenyl maleic anhydride are preferred.

c) substituted glutaric anhydride

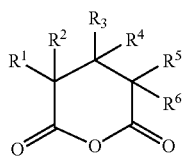

where $R^1$, $R^2$, $R^3$, $R^4$, $R^5$ and $R^6$ can be hydrogen, alkyl, alkenyl or aryl groups, and at least one group is not hydrogen.

From this class, 2-ethyl-3-methyl glutaric acid is preferred.

d) diglycolic anhydride and substituted diglycolic anhydride

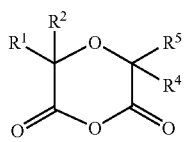

where $R^1$, $R^2$, $R^3$ and $R^4$ can be hydrogen, alkyl, alkenyl or aryl groups.

e) Substituted phthalic anhydride

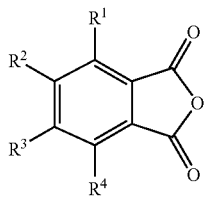

where $R^1$, $R^2$, $R^3$ and $R^4$ can be hydrogen, alkyl, alkenyl or aryl groups, and at least one group is not hydrogen.

f) diphenic anhydride and substituted diphenic anhydride

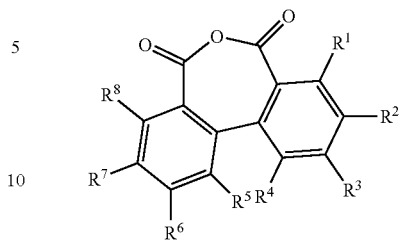

where $R^1$, $R^2$, $R^3$, $R^4$, $R^5$, $R^6$, $R^7$ and $R^8$ can be hydrogen, alkyl, alkenyl or aryl groups.

Table 1 summarizes the molecular weight and melting point of selected substituted cyclic anhydrides. For the process where the substituted cyclic anhydride is added at the preform injection molding stage, compounds with low melting points, preferably below about 50° C. are preferred.

TABLE 1

| Cyclic anhydride | M.W. | Melting Point (° C.) |
|---|---|---|
| methyl succinic anhydride | 114.1 | 33–35 |
| 2,2-dimethylsuccinic anhydride | 128.13 | 29–31 |
| phenyl succinic anhydride | 176.17 | 53–55 |
| octadecenylsuccinic anhydride | 350.52 | liquid at RT* |
| hexadecenyl succinic anhydride | 324.48 | liquid at RT* |
| eicosodecenyl succinic anhydride | 376.56 | liquid at RT* |
| 2-methylene succinic anhydride | 112.1 | 66–68 |
| n-octenyl succinic anhydride | 224.3 | liquid at RT* |
| nonenyl succinic anhydride | 210.3 | 8–12 |
| tetrapropenyl succinic anhydride | 266.4 | 14 |
| dodecyl succinic anhydride | 266.4 | 40 |
| 3-methylglutaric anhydride | 128.1 | 43–47 |
| phenyl glutaric anhydride | 190.2 | 95–99 |
| diglycolic anhydride | 116.07 | 92–93 |
| 2-ethyl 3-methyl glutaric anhydride | 156.2 | liquid at RT* |
| 3,3-dimethyl glutaric anhydride | 142.2 | 124–126 |
| 2,2-dimethyl glutaric anhydride | 142.2 | 34–38 |
| 3,3-tetramethyleneglutaric anhydride | 168.2 | 64–66 |
| 4-methyl phthalic anhydride | 162.15 | 90–92 |
| 4-t-butyl phthalic anhydride | 204.2 | 70–75 |
| tetrahydrophthalic anhydride | 152.2 | 70–74 |
| hexahydrophthalic anhydride | 154.16 | 34–38 |
| 2-methyl maleic anhydride | 112.1 | 7–8 |
| 3,4,5,6-tetrahydrophthalic anhydride | 152.2 | 69–73 |
| 1-cyclopentene-1,2-dicarboxylic anhydride | 138.1 | 46–49 |
| dimethyl maleic anhydride | 126.1 | 93–96 |
| diphenyl maleic anhydride | 250.2 | 159–162 |

*RT means room temperature

Testing Procedures

Melting Point

The melting point of the cyclic anhydrides is measured with a hot stage microscope. The hot stage is heated rapidly at first and then adjusted to 2° C./min. during the last 10° C. preceding the expected melting point. The melting point is defined as the range from the temperature that melting is first observed to that at which melting is complete.

CEG

The CEG value of a polymer is determined by dissolving a sample of the polymer in reagent grade benzyl alcohol and titrating to the purple end point of phenol red indicator with 0.03 N sodium hydroxide/benzyl alcohol solution. The results are reported in millimoles sodium hydroxide per kilogram (mmol/kg) of the sample.

DEG

The DEG (diethylene glycol) content of the polymer is determined by hydrolyzing the polymer with an aqueous solution of ammonium hydroxide in a sealed reaction vessel at 220±5° C. for approximately two hours. The liquid portion of the hydrolyzed product is then analyzed by gas chromatography. The gas chromatography apparatus is a FID Detector (HP5890, HP7673A) from Hewlett Packard. The ammonium hydroxide is 28 to 30% by weight ammonium hydroxide from Fisher Scientific and is reagent grade.

IV

The intrinsic viscosity (IV) of the polymer is determined by mixing 0.2 grams of an amorphous polymer composition with twenty milliliters of dichloroacetic acid at a temperature of 25° C. using an Ubbelhode viscometer to determine the relative viscosity (RV). RV is converted to IV using the ISO certificated equation:

$$IV=[(RV-1)\times 0.6907]+0.63096$$

Acetaldehyde (AA)

The analysis of acetaldehyde in the polymer and preforms, in parts per million, is determined by obtaining a representative sample of the polymer or preform, cryogenically grinding the polymer (using liquid nitrogen) such that the polymer passes through a number ten mesh sieve but collects on a 25 mesh sieve. A weighted portion is then heated at 160. degree. C. for 90 min. in a closed system to release the acetaldehyde. The acetaldehyde content of the headspace in the closed system is then analyzed by gas chromatography and the parts per million acetaldehyde is determined therefrom. The gas chromatography apparatus employed is the same as that employed for the DEG analysis.

Anhydride

The total amount of anhydride in the polymer resin is determined by hydrolyzing a sample in dilute sulfuric acid in a stainless steel bomb at 235° C. for 3 hours. The aqueous solution from the bomb and three water extractions are combined in a 25 ml volumetric flask. An aliquot is filtered and analyzed by High Pressure Liquid Chromatography (HPLC) to determine the anhydride content, based on calibration standards.

The amount of free anhydride in the polymer resin is determined by dissolving a sample in hexafluorisopropanol (HFIP), precipitating the solution with methanol, then washing and filtering to remove all traces of HFIP. This precipitated polymer was analyzed as above for anhydride content. The difference gives the amount of unreacted anhydride in the polymer sample.

Stress Cracking

The resistance of a bottle to stress cracking is determined at an accelerated test using sodium hydroxide to induce stress cracking. Twenty-five bottles are used as a set. The bottles are filled with water at 22° C. to a target net contents (2 liter bottles would contain 2 liters of water). Each bottle is pressurized with compressed air to an equivalent internal pressure of 531 kPa (77 psi). Five minutes after pressurization, each bottle is placed in individual pockets containing a 0.2 percent sodium hydroxide solution at 22° C. The solution covers the base of the bottle up to the top of the strap of the bottle. The time for failure of each bottle is recorded. Failure is defined as a burst or slow leak as evidenced by a drop in the level of water in the bottle. The test is completed after four hours. Results are reported as the number of failures in a four-hour period, and as the average time to fail.

Haze

The haze of the preforms was measured with a Hunter Lab ColorQuest II instrument. The haze is defined as the percent of diffused light to total transmitted light.

Preform and Bottle Production

After solid state polymerization, the resin of the present invention is typically heated and extruded into preforms. Each preform for a 20 ounce (0.6 liter) soft drink bottle, for example, employs about 26.8 grams of the resin. The preform is then heated to about 100–120° C. and blown-molded into a 20 ounce (0.6 liter) contour bottle at a stretch ratio of about 12.5. The stretch ratio is the stretch in the radial direction times the stretch in the length (axial) direction. Thus if a preform is blown into a bottle, it may be stretched about two times its length and stretched about six times is diameter giving a stretch ratio of twelve (2×6). Since the bottle size is fixed, different preform sizes can be used for obtaining different stretch ratios. The preforms tested in the examples for the 20 ounce contour bottles have from 5.0 to 5.4 grams of resin in the base. More specifically, the weight of the bottle base was primarily from 5.2 to 5.3 grams. Most stress cracking occurs in the base of the bottle. Testing for stress cracking should be completed with bottles having a base of about the same thickness (i.e., the same amount of resin) to give comparable results.

EXAMPLES

A pilot continuous reactor consisting of a primary esterifier, secondary esterifier, low polymerizer and high polymerizer was used to prepare resins with various cyclic anhydrides. The anhydrides were metered through a pump into the transfer line, containing a static mixer, from the exit of the high polymerizer, prior to extrusion into a strand for cutting into pellets. By changing the throughput of this reactor, the effect of residence time on the amount of anhydride reacted could be studied.

Example 1

A comparative trial was conducted, following the teachings of the prior art (U.S. Pat. No. 6,342,578), using succinic anhydride. The continuous polymerization conditions are given in Table 2. The paste feeding the primary esterifier consisted of terephthalic acid (PTA), ethylene glycol (EG), isophthalic acid (IPA), diethylene glycol (DEG) and antimony trioxide ($Sb_2O_3$) as the polycondensation catalyst. A solution of cobalt acetate and poly phosphoric acid (phosphorus/cobalt mole ratio 1.1:1) was added in the transfer line between the primary and secondary esterifier. The high polymerizer vacuum level was controlled to give a target polymer IV of 0.58.

TABLE 2

| Parameter | Set Point |
| --- | --- |
| PTA/EG mole ratio | 1.1095 |
| IPA, wt-% | 2.5 |
| DEG, wt-% | 0.55 |
| $Sb_2O_3$, ppm Sb | 234 |
| Cobalt acetate, ppm Co | 23.5 |
| Primary Esterifier temp., °C. | 260 |
| Primary Esterifier pressure, barg | 1.5 |
| Secondary Esterifier temp., °C. | 268 |
| Secondary Esterifier, barg | 1.0 |
| Low Polymerizer temp., °C. | 275 |

TABLE 2-continued

| Parameter | Set Point |
|---|---|
| Low Polymerizer, mbar | 20 |
| High Polymerizer temp., ° C. | 280 |

Residence time, from the addition of 0.4 wt-% (40 mmol/kg) molten succinic anhydride (SA) to extrusion, was varied from 1.6 to 10.8 minutes. The control runs contained no SA. The resin was measured for its chemical properties and the amount of unreacted succinic anhydride. The results are set forth in Table 3.

TABLE 3

| | Run No. | | | | | |
|---|---|---|---|---|---|---|
| | 1 | 2 | 3 | 4 | 5 (control) | 6 (control) |
| Residence time, min. | 1.6 | 2.4 | 5.0 | 10.8 | 2.4 | 10.8 |
| IV, dl/g | 0.583 | 0.579 | 0.581 | 0.590 | 0.587 | 0.600 |
| CEG, mmol/kg | 60.5 | 62.6 | 61.1 | 60.2 | 23.5 | 28.6 |
| Unreacted SA, % | 24.3 | 18.2 | 13.6 | 3.8 | — | — |

This example shows that the amount of unreacted succinic anhydride decreases with increasing residence time. However there is a need for an anhydride that reacts at a faster rate such that the reaction is essentially complete after 2 to 4 minutes.

Example 2

Example 1 was repeated using octenyl succinic anhydride (OSA) (Dixie Chemical Company, Houston, Tex., U.S.A.) in place of succinic anhydride. The residence time was held constant at 2.5 minutes. The chemical properties of the polymer are set forth in Table 4.

TABLE 4

| Run No. | OSA, wt-% | IV | CEG, mmol/kg | Increase in CEG, mmol/kg | Theoretical increase in CEG, mmol/kg |
|---|---|---|---|---|---|
| 7 | 0 | 0.580 | 29 | — | — |
| 8 | 0.4 | 0.581 | 49 | 20 | 20 |
| 9 | 0.8 | 0.584 | 71 | 42 | 40 |

The CEG of the extracted polymer was comparable to the original polymer. This, coupled with the measured increase in CEG being theoretical, shows that OSA completely reacted within the 2.5 minutes residence time.

Example 3

Example 2 was repeated except octadeceynl succinic anhydride (ODSA) (Dixie Chemical Company, Houston, Tex., U.S.A.) was used in place of succinic anhydride. The chemical properties of the polymer are set forth in Table 5.

TABLE 5

| Run No. | ODSA, wt-% | IV | CEG, mmol/kg | Increase in CEG, mmol/kg | Theoretical increase in CEG, mmol/kg |
|---|---|---|---|---|---|
| 10 | 0 | 0.588 | 30.3 | — | — |
| 11 | 0.4 | 0.587 | 41.2 | 10.9 | 11.6 |
| 12 | 0.8 | 0.568 | 52.5 | 22.2 | 23.2 |

The CEG of the extracted polymer was comparable to the original polymer. This, coupled with the measured increase in CEG being theoretical, shows that ODSA completely reacted within the 2.5 minutes residence time (0.8 wt-% ODSA is 22.8 mmole/kg).

The amorphous polymer from these runs were solid state polymerized in a 200 kg tumble dryer at a polymer temperature of 208° C. to an IV of 0.89. The time and rate of polymerization and the resin CEG values are set forth in Table 5.

TABLE 5

| Run No. | Time, Hours | IV, dl/g | Rate, dl/g/hr | CEG, mmol/kg |
|---|---|---|---|---|
| 10 | 23 | 0.894 | 0.0122 | 18 |
| 11 | 20.5 | 0.895 | 0.0155 | 27 |
| 12 | 18 | 0.882 | 0.0157 | 33 |

Increasing the amount of ODSA increased the rate of solid state polymerization, and increased the CEG level of the final product compared to the control.

The average time for failure in the caustic stress cracking test was 167 and 159 minutes for runs 11 and 12 respectively, compared to 111 minutes for the control with the lower CEG.

Example 4

Using a pilot batch DMT reactor two other high molecular weight cyclic anhydrides were studied. These were 1,8-naphthoic anhydride (1,8 NA) and hexahydrophthalic anhydride (HHPA) obtained from Sigma-Aldrich Corporation, St. Louis, Mo., U.S.A.

A batch containing 0.8 wt-% 1,8 NA added at the end of polycondensation with a residence time of 2 minutes contained no bound 1,8 NA. It is believed that this structure favors reformation of the anhydride from the monoester. These structures are not part of the invention.

A batch containing 0.6 wt-% HHPA added at the end of polymerization with a 2 minute residence time showed the theoretical CEG increase of 36 mmol/kg compared to the control at 20 mmol/kg.

Example 5

Alkenyl succinic anhydrides (ASA) are sold commercially and typically contain a mixture of alkenyl succinic anhydrides. Albemarle Corporation sell an ASA that contains 54% hexadecenyl, 34% octadecenyl and 10% eicosodecenyl succinic anhydride, the molecular weight of this mixture is 331. This liquid ASA was injected with commercial polyester bottle resins Type 8816, a 0.80 IV PET homopolymer and Type 3302, a 0.79 IV copolymer containing 2.4 wt-% IPA (KoSa, Spartanburg, S.C., U.S.A.) in the injection molding machine (Arburg) and preforms made. The chemical analyses of the preforms are set forth in Table 6.

TABLE 6

| Resin | ASA, wt-% | Preform CEG, mmol/kg | Theoretical Increase in CEG, mmol/kg |
|---|---|---|---|
| 8816 | 0 | 27 | 0 |
| 8816 | 0.5 | 40 | 13.7 |
| 8816 | 1.0 | 54 | 27.5 |
| 8816 | 1.5 | 69 | 54.5 |
| 3302 | 0 | 24 | 0 |
| 3302 | 0.5 | 40 | 13.7 |

The increase in CEG in the preforms was theoretical indicating that the ASA fully reacted with the resin.

Example 6

As in Example 5, 4,000 ppm ASA was injected with a higher IV (0.88) resin, a copolyester containing 2.4 wt-% IPA on a single position Arburg machine into 27 g. preforms. These preforms were blown into 0.6 liter bottles and tested for caustic stress cracking. The results are set forth in Table 7.

TABLE 7

| Resin, ppm ASA | Preform IV, dl/g | Preform CEG, mmol/kg | % bottles failing in 4 hours | Average failure time, minutes |
|---|---|---|---|---|
| 0 | 0.795 | 32 | 100 | 182 |
| 4,000 | 0.785 | 44 | 24 | 234 |

This illustrates that the increase in CEG by using ASA reduced the number of bottles failing from 100 to 24%.

Thus it is apparent that there has been provided, in accordance with the invention, a product and a process for making that product that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. A resin comprising: polyethylene terephthalate or a copolyester of polyethylene terephthalate and a dicarboxylic acid or its ester equivalent or a copolyester of polyethylene terephthalate and a diol, and substituted cyclic anhydride, said substituted cyclic anhydride being not more than 100 microequivalents per gram of said polyester or copolyester, said resin having a CEG content greater than about 25 microequivalents per gram, said substituted cyclic anhydride is selected form the class consisting of:

a) substituted succinic anhydrides

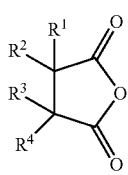

where $R^1$, $R^2$, $R^3$, and $R^4$ can be hydrogen, alkyl, alkenyl or aryl groups, and at least one group is not hydrogen;

b) substituted maleic anhydride

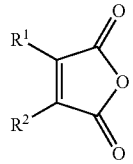

where $R^1$ and $R^2$ can be hydrogen, alkyl, alkenyl or aryl groups, and at least one group is not hydrogen;

c) substituted glutaric anhydride

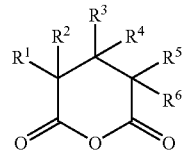

where $R^1$, $R^2$, $R^3$, $R^4$, $R^5$ and $R^6$ can be hydrogen, alkyl, alkenyl or aryl groups, and at least one group is not hydrogen;

d) diglycolic anhydride and substituted diglycolic anhydride

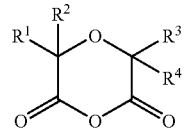

where $R^1$, $R^2$, $R^3$ and $R^4$ can be hydrogen, alkyl, alkenyl or aryl groups;

e) Substituted phthalic anhydride

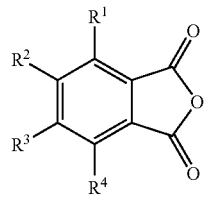

where $R^1$, $R^2$, $R^3$, and $R^4$ can be hydrogen, alkyl, alkenyl or aryl groups, and at least one group is not hydrogen;

f) diphenic anhydride and substituted diphenic anhydride where $R^1$, $R^2$, $R^3$, $R^4$, $R^5$, $R^6$, $R^7$ and $R^8$ can be hydrogen, alkyl, alkenyl or aryl groups.

2. The resin of claim 1, wherein said substituted succinic anhydride is selected from the group of methyl succinic anhydride, 2,2-dimethyl succinic anhydride, phenyl succinic anhydride, octadecenyl succinic anhydride, hexadecenyl succinic anhydride, eicosodecenyl succinic anhydride, 2-methylene succinic anhydride, and mixtures of these.

3. The resin of claim 1, wherein said substituted glutaric anhydride is selected from the group of 3-methyl glutaric anhydride, phenyl glutaric anhydride, diglycolic anhydride, 2-ethyl 3-methyl glutaric anhydride, 2,2-dimethyl glutaric anhydride, 3,3-tetrametheylene glutaric anhydride, and mixtures of these.

4. The resin of claim 1, wherein said substituted phthalic anhydride is selected from the group of 4-methyl phthalic anhydride, 4-t-butyl phthalic anhydride, tetrahydrophthalic anhydride, hexahydrophthalic anhydride, and mixtures of these.

5. The resin of claim 1, wherein said substituted maleic anhydride is selected from the group of tetrahydrophthalic anhydride, dimethyl maleic anhydride, 1-cyclopentene-1,2-dicarboxylic anhydride or mixtures of these.

6. The resin of claim 1, wherein said resin has an I.V. of greater than about 0.70.

7. The resin of claim 1, wherein said CEG is less than about 80 microequivalents per gram.

8. A preform made from polyethylene terephthalate or a copolyester of polyethylene terephthalate and a dicarboxylic acid or its ester equivalent or a copolyester of polyethylene terephthalate and a diol, and substituted cyclic anhydride, said substituted cyclic anhydride being not more than 100 microequivalents per gram of said polyester or copolyester, said resin having a CEG content greater than about 25 microequivalents per gram, said substituted cyclic anhydride is selected form the class consisting of:

a. substituted succinic anhydrides

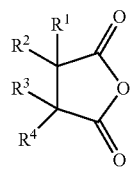

where $R^1$, $R^2$, $R^3$, and $R^4$ can be hydrogen, alkyl, alkenyl or aryl groups, and at least one group is not hydrogen;

b. substituted maleic anhydride

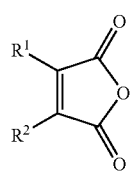

where $R^1$, $R^2$ can be hydrogen, alkyl, alkenyl or aryl groups, and at least one group is not hydrogen;

c. substituted glutaric anhydride

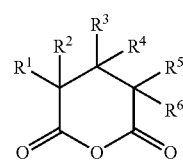

where $R^1$, $R^2$, $R^3$, $R^4$, $R^5$ and $R^6$ can be hydrogen, alkyl, alkenyl or aryl groups, and at least one group is not hydrogen;

d. diglycolic anhydride and substituted diglycolic anhydride

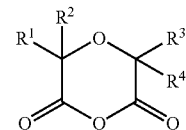

where $R^1$, $R^2$, $R^3$, and $R^4$ can be hydrogen, alkyl, alkenyl or aryl groups;

e. Substituted phthalic anhydride

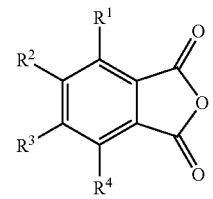

where $R^1$, $R^2$, $R^3$, and $R^4$ can be hydrogen, alkyl, alkenyl or aryl groups, and at least one group is not hydrogen;

f. diphenic anhydride and substituted diphenic anhydride

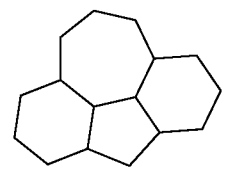

where $R^1$, $R^2$, $R^3$, $R^4$, $R^5$, $R^6$, $R^7$ and $R^8$ can be hydrogen, alkyl, alkenyl or aryl groups.

9. A bottle made from polyethylene terephthalate or a copolyester of polyethylene terephthalate and a dicarboxylic acid or its ester equivalent or a copolyester of polyethylene terephthalate and a diol, and substituted cyclic anhydride, said substituted cyclic anhydride being not more than 100 millimoles per kilogram of said polyester or copolyester, said resin having a CEG content greater than about 25 millimoles per kilogram, said substituted cyclic anhydride is selected form the class consisting of:

a. substituted succinic anhydrides

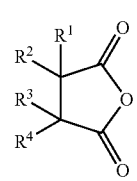

where $R^1$, $R^2$, $R^3$, and $R^4$ can be hydrogen, alkyl, alkenyl or aryl groups, and at least one group is not hydrogen;

b. substituted maleic anhydride

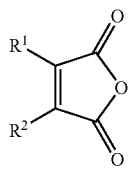

where $R^1$ and $R^2$ can be hydrogen, alkyl, alkenyl or aryl groups, and at least one group is not hydrogen;

c. substituted glutaric anhydride

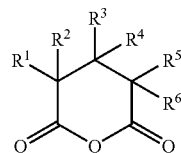

where $R^1$, $R^2$, $R^3$, $R^4$, $R^5$ and $R^6$ can be hydrogen, alkyl, alkenyl or aryl groups, and at least one group is not hydrogen;

d. diglycolic anhydride and substituted diglycolic anhydride

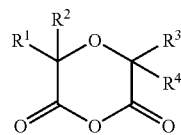

where $R^1$, $R^2$, $R^3$, and $R^4$ can be hydrogen, alkyl, alkenyl or aryl groups;

e. Substituted phthalic anhydride

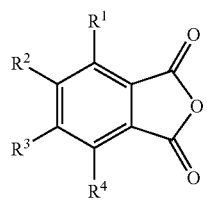

where $R^1$, $R^2$, $R^3$, and $R^4$ can be hydrogen, alkyl, alkenyl or aryl groups, and at least one group is not hydrogen;

f. diphenic anhydride and substituted diphenic anhydride

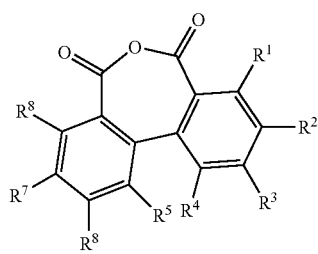

where $R^1$, $R^2$, $R^3$, $R^4$, $R^5$, $R^6$, $R^7$ and $R^8$ can be hydrogen, alkyl, alkenyl or aryl groups.

10. A method of making a resin, used to make a container having reduced caustic stress cracking, comprising: forming polyester or copolyester by esterification followed by polycondensation to make a polyethylene terephthalate or polyethylene terephthalate copolyester; adding at the end of said polycondensation not more than 100 millimoles per kilogram based on said polyester or copolyester of a substituted cyclic anhydride, said resin having a CEG content greater than about 25 millimoles per kilogram, wherein said resin has a I.V of greater than about 0.70, said substituted cyclic anhydride is selected form the class consisting of:

a. substituted succinic anhydrides

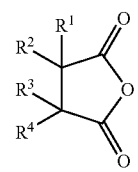

where $R^1$, $R^2$, $R^3$, and $R^4$ can be hydrogen, alkyl, alkenyl or aryl groups, and at least one group is not hydrogen;

b. substituted maleic anhydride

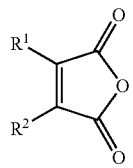

where $R^1$ and $R^2$ can be hydrogen, alkyl, alkenyl or aryl groups, and at least one group is not hydrogen;

c. substituted glutaric anhydride

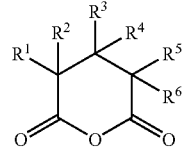

where $R^1$, $R^2$, $R^3$, $R^4$, $R^5$ and $R^6$ can be hydrogen, alkyl, alkenyl or aryl groups, and at least one group is not hydrogen;

d. diglycolic anhydride and substituted diglycolic anhydride

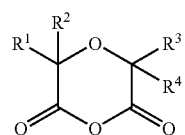

where $R^1$, $R^2$, $R^3$, and $R^4$ can be hydrogen, alkyl, alkenyl or aryl groups;

e. Substituted phthalic anhydride

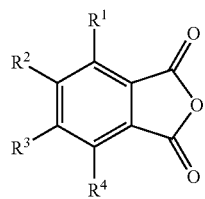

where $R^1$, $R^2$, $R^3$, and $R^4$ can be hydrogen, alkyl, alkenyl or aryl groups, and at least one group is not hydrogen;

f. diphenic anhydride and substituted diphenic anhydride

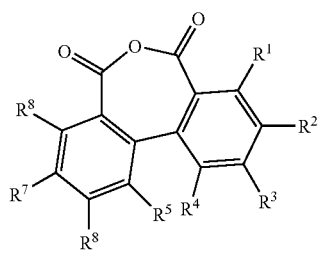

where $R^1$, $R^2$, $R^3$, $R^4$, $R^5$, $R^6$, $R^7$ and $R^8$ can be hydrogen, alkyl, alkenyl or aryl groups.

11. The method of claim 10, wherein said substituted succinic anhydride is selected from the group of methyl succinic anhydride, 2,2-dimethyl succinic anhydride, phenyl succinic anhydride, octadecenyl succinic anhydride, hexadecenyl succinic anhydride, eicosodecenyl succinic anhydride, 2-methylene succinic anhydride, and mixtures of these.

12. The method of claim 10, wherein said substituted glutaric anhydride is selected from the group of 3-methyl glutaric anhydride, phenyl glutaric anhydride, diglycolic anhydride, 2-ethyl 3-methyl glutaric anhydride, 2,2-dimethyl glutaric anhydride, 3,3-tetramethylene glutaric anhydride, and mixtures of these.

13. The method of claim 10, wherein said substituted phthalic anhydride is selected from the group of 4-methyl phthalic anhydride, 4-t-butyl phthalic anhydride, tetrahydrophthalic anhydride, hexahydrophthalic anhydride, and mixtures of these.

14. The method of claim 10, wherein said substituted maleic anhydride is selected from the group of tetrahydrophthalic anhydride, dimethyl maleic anhydride, 1-cyclopentene-1,2-dicarboxylic anhydride or mixtures of these.

15. The method of claim 10, wherein said substituted anhydride has a melt point of less than about 100° C.

16. The method of claim 10, wherein said substituted anhydride has a melt point at about 25° C.

17. A container having reduced caustic stress cracking made from the resin produced according to claim 10.

* * * * *